United States Patent [19]

Fujinawa et al.

[11] 4,143,310

[45] Mar. 6, 1979

[54] APPARATUS FOR POSITIONING

[75] Inventors: Masaaki Fujinawa, Hachioji; Tatsuo Goto, Tokyo; Mineo Harada, Owari-asahi, all of Japan

[73] Assignee: Hitachi, Ltd., Japan

[21] Appl. No.: 746,627

[22] Filed: Dec. 1, 1976

[30] Foreign Application Priority Data

Dec. 5, 1975 [JP] Japan ................................. 50-143981

[51] Int. Cl.$^2$ ............................................. G05B 19/24
[52] U.S. Cl. ..................................... 318/571; 318/603
[58] Field of Search .................. 318/603, 571, 341, 39

[56] References Cited
U.S. PATENT DOCUMENTS

| | | | |
|---|---|---|---|
| 3,512,060 | 5/1970 | Floyd | 318/603 |
| 3,864,613 | 2/1975 | Cutler | 318/571 X |
| 3,952,238 | 4/1976 | Cutler | 318/571 |
| 3,979,653 | 9/1976 | Cutler | 318/571 |
| 4,008,829 | 2/1977 | Chandra et al. | 318/571 |
| 4,066,941 | 1/1978 | Foster | 318/603 |

*Primary Examiner*—Benjamin Dobeck
*Attorney, Agent, or Firm*—Craig & Antonelli

[57] ABSTRACT

An apparatus for positioning is characterized by the fact that the circuit for generating a reference velocity, the existence of which is primarily responsible for the disadvantages in the conventional apparatus for positioning by analog feed-back of the velocity, is eliminated and a data processing unit is substituted for this circuit. Thus, the positioning is controlled by a group of predetermined reference velocity values stored beforehand in the memory of the data processing unit.

19 Claims, 7 Drawing Figures

APPARATUS FOR POSITIONING

BACKGROUND OF THE INVENTION

This invention relates to an apparatus for positioning an object by means of a servo-control system.

Conventionally, in an apparatus for quickly and accurately positioning an object, a digital servo-control system which utilizes a feed back signal or signals based on velocity and position has been used. A typical example of such a known system is illustrated in FIG. 1, wherein the reference number 1 designates a position counter providing an output denoting a direction and a distance to a predetermined stopping point. The position counter 1 reduces its count one by one in response to receipt of a position pulse signal from a position detector 8. The position detector 8, which is mechanically connected to a servo-motor 6, generates a position pulse signal every time a controlled object (not shown in the drawing) moves a unit distance.

A velocity detector 7, which is also connected mechanically to the servo-motor 6, generates a voltage in proportion to the rotating velocity of the motor 6, and supplies this output voltage to an analog adder 4 which makes an addition of the inputs thereto and provides an output analog value. An analog power amplifier 5 connected to the output of the adder 4 provides power amplification of the analog amount.

A circuit 2 for generating a reference velocity receives a signal from the position counter 1 and produces an analog signal of a reference velocity value $\dot{X}_{01}$ corresponding to the position signal $X_1$ as shown in FIG. 2. The reference velocity value $\dot{X}_{01}$ represents a reference velocity in the velocity servo-loop comprising the power amplifier 5, the servo-motor 6, and the velocity detector 7. In the circuit 2 for determining a reference velocity, the reference velocity value $\dot{X}_0$ is reduced, as shown in FIG. 2, as the position X of the object approaches the origin or stopping point.

The apparatus for positioning which includes such an analog velocity control system, controls the velocity pattern at stopping by means of a negative feed back of the analog velocity signal, to thereby position the object quickly, precisely and stably. But the conventional positioning apparatus based on the above-described analog velocity control system has a disadvantage in that the circuit for determining the reference velocity establishes a reference velocity value $\dot{X}_0$ with respect to the position X of the object as shown in FIG. 2.

In order to decelerate smoothly, a reference velocity value should not show a graded characteristic, as shown in FIG. 2, but is required to approach a character of a smooth and continuous curve by increasing the number of steps. But an increase in the number of steps in the pattern makes the circuit for determining the reference velocity more complicated and expensive. Generally, when in a servo system of this type, the inertia moment and the load friction torque of a controlled object are changed, the characteristic of the circuit 2 for determining the reference velocity has to be varied according to the change of the controlled object.

In order to change the characteristic of the circuit 2, the whole construction of the circuit 2 is required to be changed. This means that the circuit 2 has to be designed again from the beginning. That is to say, the conventional apparatus for positioning as shown in FIG. 1 has another disadvantage in that it is lacking in adaptability and the degree of freedom of change in characteristic.

SUMMARY OF THE INVENTION

An object of the present invention is to eliminate the above-mentioned disadvantages of the conventional positioning system and to provide an apparatus for quick and accurate positioning with a simple circuit construction and with a high adaptability against the change of the characteristic of the controlled object.

In order to attain the above object, an apparatus for positioning, according to the present invention, is characterized by the fact that the circuit for determining the reference velocity, the existance of which is responsible for the worst disadvantages in the conventional apparatus for positioning by analog feed back of the velocity, is not required, since a memory of a computer (or a data processing unit) is substituted for that circuit. Thus, the positioning is controlled by a group of predetermined reference velocity values which have been memorized beforehand in the computer. Furthermore, by changing the values stored in the memory, the present invention can respond readily to the change of the characteristic of the controlled object with a high adaptability. Also, by increasing the memory capacity of the computer, the present invention can make the graded characteristic as shown in FIG. 2 more smooth.

These and other objects, features, and advantages of the present invention will be made more apparent by the following detailed description of the various embodiments of the present invention as illustrated in the accompanying drawings.

DESCRIPTION OF THE PREFERRED EMBODIMENTS

The present invention will be hereinafter explained in detail in conjunction with various exemplary embodiments.

Figure 1:
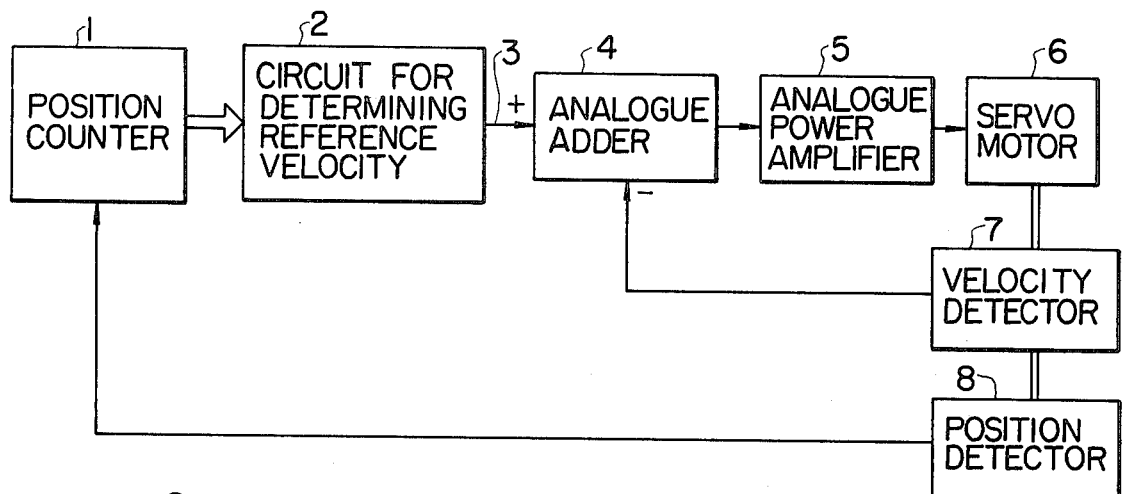
FIG. 1 is a block diagram of an apparatus for positioning an object using a conventional analog control system.
Figure 4:
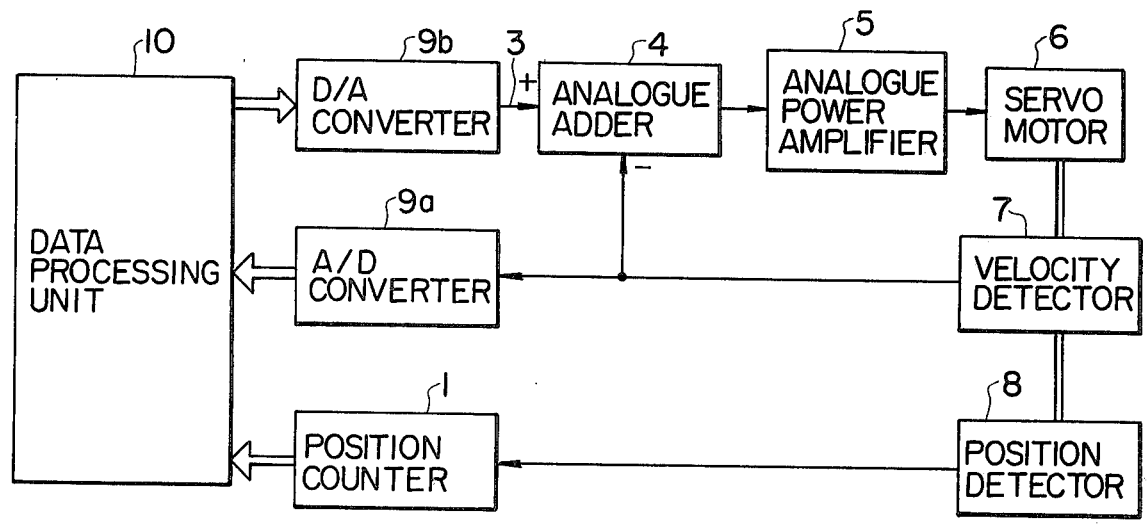
FIG. 4 is a block diagram showing an exemplary embodiment of the present invention.
Figure 3:
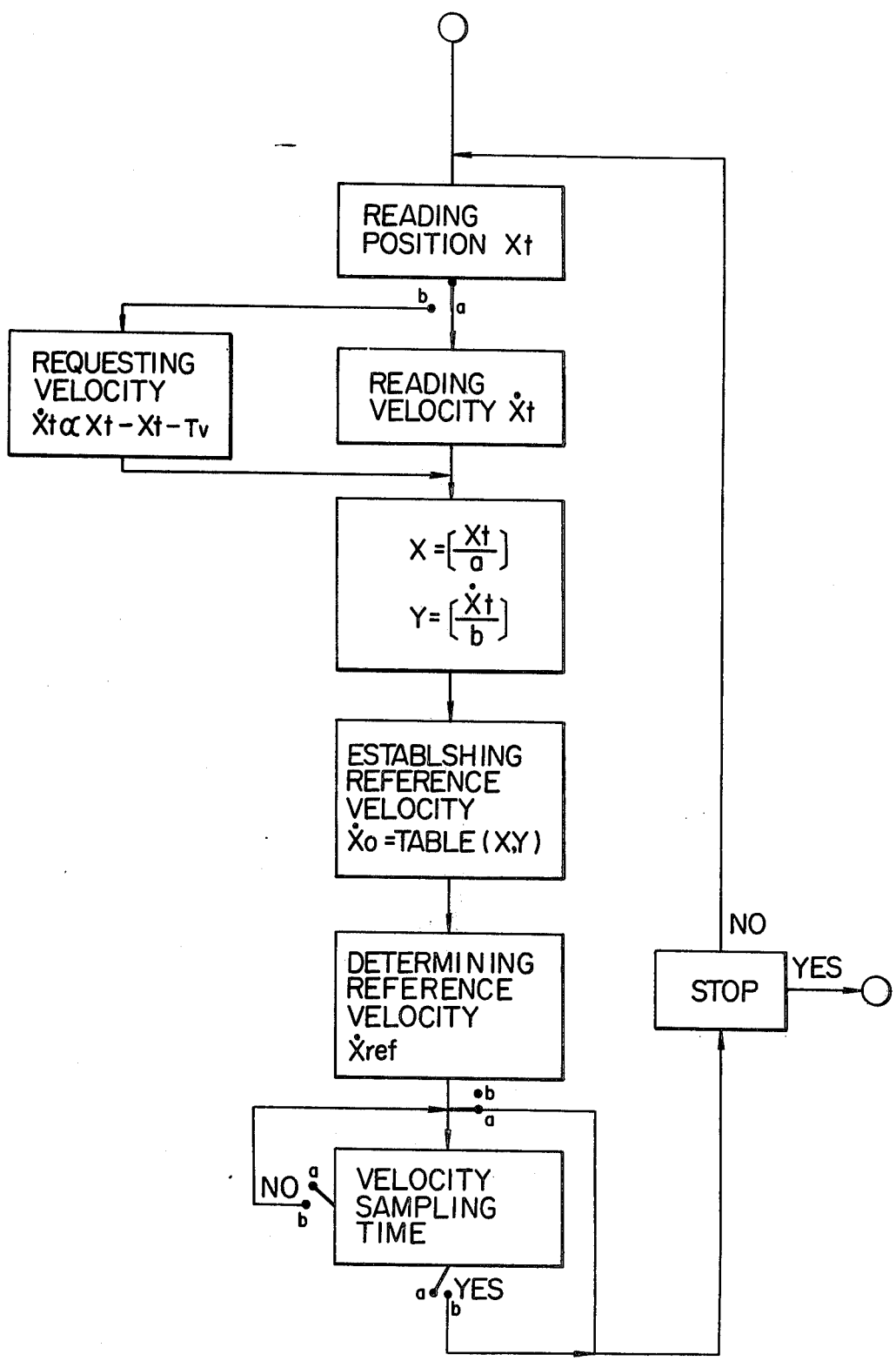
FIG. 3 is a flow diagram showing a treatment process by a computer in an embodiment of the present invention.

FIG. 3 is a flow diagram showing a treatment process by a computer in an apparatus for positioning an object according to the present invention, and FIG. 4 is a block diagram of one embodiment of the present invention. The reference numerals 1, 3, 4, 5, 6, 7, and 8, as shown in FIG. 4, respectively, designate the same elements as those similarly designated in the conventional apparatus as shown in FIG. 1.

A data processing unit 10 (e.g., a general purpose computer, a micro-computer, etc.) reads data from a position counter 1 and data which has been converted from a voltage value obtained from the velocity detector 7 into a digital value by an analog to digital (A/D) converter 9a. A group of the reference velocities corresponding to the positions and velocities of the controlled object is stored beforehand in the computer 10 in the form of a reference velocity table. The computer 10 processes the data of the position and velocity of the controlled object according to the flow chart as shown with the representative switches in the a position in FIG. 3 and puts out the reference velocity value $\dot{X}_0$ in the form of a digital value. The value $\dot{X}_0$ is converted into an analog value by a D/A converter 9b, and the analog value of $\dot{X}_0$ is used as a reference velocity signal 3. Then, the analogue adder has one input connected to the data processing unit 10 through the D/A converter 9b and a second input connected to the velocity detector 7.

The above-mentioned reference velocity table (or, a group of the reference velocities) can be predetermined in the following way. Firstly, the controlled object moves at the maximum velocity and then has applied thereto the maximum brake and then stops at the desired stopping position without over-shooting, so that the phase trajectory diagram can be sought; secondly, the maximum value of the velocities which are not over the limit which does not over-shoot the phase trajectory is used as a value at a position $X_t$ and velocity $\dot{X}_t$ in a group of the reference velocities.

As seen in FIG. 3, the data processing unit 10 reads the position data $X_t$ from the position counter 1 as shown in FIG. 4, the suffix t of X denoting the present time, and further reads the velocity data $\dot{X}_t$ which has been converted from an analog voltage value derived from the velocity detector 7 into a digital value in the A/D converter 9a. The reference velocity is predetermined corresponding to the position and velocity data according to the above-described operation. In this case, since the memory capacity of the data processing unit is finite, it is necessary to divide the values of the position and velocity data into a region with an appropriate width and then to establish the reference velocity corresponding to the position and velocity data within the divided region as stated above.

In order to determine the reference velocity corresponding to the present position and velocity, it is necessary to determine to which one of the divided regions as stated above the present position and velocity belongs. In the computer, the processing can be done by the following relation:

$$X = [\frac{X_t}{a}], Y = [\frac{\dot{X}_t}{b}]$$

wherein a and b denote the width of the divided region of the position and velocity, respectively, and [ ] denotes the mark of Gauss in mathematics, i.e., generally, [Z] meaning the maximum integer not exceeding Z.

Thus, in the computer, one reference velocity value can be established corresponding to a couple of X and Y. In this case, the velocity data is calculated by the difference of the present position data $X_t$ and the position data $X_{t-T_r}$ which has been read at a previous time, wherein $T_r$ denotes a sampling time (interval), and further the above processing is done during every sampling time $T_r$.

A negative feed back system of a position and velocity signal in accordance with the present invention is similar to an analog control system in the conventional art, and this also in the present invention as well as in the conventional analog control system, it is possible to position the object quickly, accurately, and stably.

Figure 5:
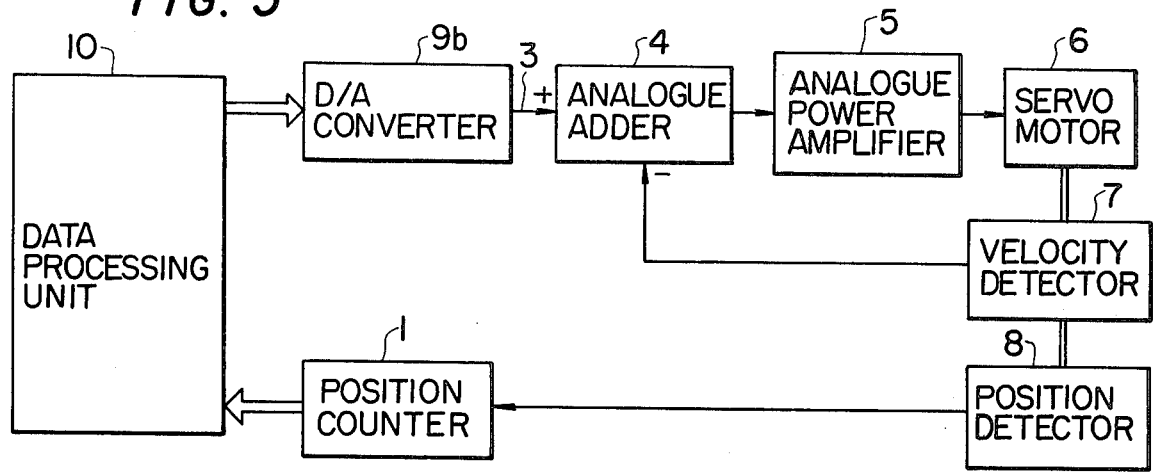
FIGS. 5, 6, and 7 are block diagrams showing other embodiments of the present invention, respectively.

FIG. 5 shows another embodiment of the present invention. By reading the data of the position counter 1 sequentially at a constant time interval and processing the difference of the data of the position counter 1 which has been read just now in the computer, and the data of the position counter 1 which has been read at least once before or more than twice in the computer, without directly reading the data of the velocity at the present time from the velocity detector 7 in the computer, the information concerning the velocity as well as the position can be obtained.

The processing steps as shown in FIG. 5 are represented by the representative switches being in the b position in FIG. 3. Moreover, by dividing the data of the position and the velocity into the region with an equal width, the processing steps as shown in FIG. 3 will be more simplified.

Figure 6:
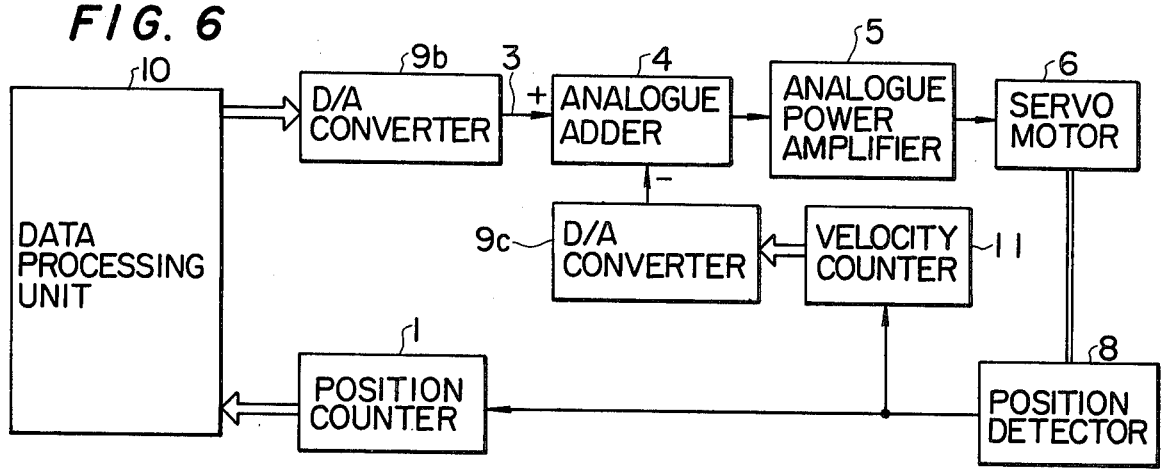

FIG. 6 shows a further embodiment of the present invention. The velocity detector 7 can be removed, and by counting the position pulses per unit time from the position detector 8, the information concerning the velocity is obtained in a velocity counter 11. And, a D/A converter 9c, converts the data from the velocity counter 11 into the analog value.

Figure 7:
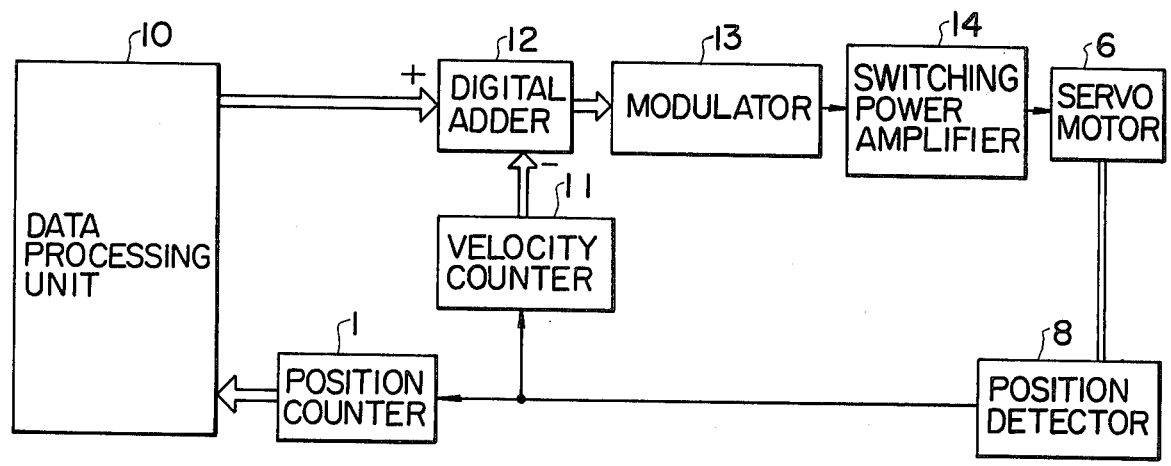

FIG. 7 shows still another embodiment which removes the D/A converters as shown in FIG. 6. The addition of the reference velocity and the measurement velocity is done by a digital adder 12. A switching power amplifier 14 is operated by the signal which has been modulated into a pulse width by a pulse width modulator 13, according to the result added digitally, and then a motor 6 is driven by the pulse width modulated signal of the switching power amplifier 14. In the case of the apparatus as shown in FIG. 7, it is not required to adjust the apparatus after the construction since the apparatus does not use an analog circuit, and further the apparatus can be cheaply constructed since a control system of the apparatus does not include expensive D/A and A/D converters.

Figure 2:
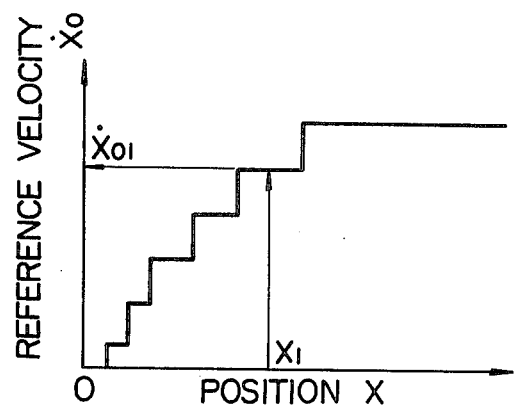
FIG. 2 is a characteristic diagram of a circuit for determining a reference velocity.

As stated above in detail, the apparatus for positioning an object according to the present invention can respond to any controlled object with ease and a high adaptability by varying the memory contents of a computer. A graded characteristic as shown in FIG. 2 can be given more finely and smoothly by increasing the memory capacity of the computer. Furthermore, according to the present invention, the deceleration pattern which positions from any condition of velocity at the shortest time period, can be accurately and smoothly accomplished, and the construction of the circuit can be also simplified.

The apparatus for positioning an object according to the present invention, especially, can be effectively used in a servo mechanism in which an accurate and smooth positioning is required, e.g., in a printer-head carriage mechanism and paper feed mechanism as a console unit of a computer, a positioning apparatus for an NC (numerical control) machine tool, and so on, by means of numerical processing in a computer, such as a microcomputer and the like.

While we have shown and described an embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed is:

1. An apparatus for positioning an object comprising
   servo motor means for controlling the position of a controlled object,
   first means for detecting the position and velocity of the controlled object and for producing signals concerning these quantities,
   data processing means for producing a reference velocity signal including means for storing a group of predetermined reference velocities corresponding to the position and velocity of said controlled object in the form of a reference velocity table, means for reading the output signal from said first means, and means for producing a reference velocity signal corresponding to the position and velocity of said controlled object in accordance with said reference velocity table,
   second means for adding the reference velocity signal and the velocity signal obtained from said first means, and
   third means responsive to the output signal of said second means for controlling and driving said servo motor means.

2. An apparatus for positioning an object as claimed in claim 1, wherein said first means comprises position detector means mechanically connected to said servo motor means for detecting the position of the controlled object, velocity detector means mechanically connected to said servo motor means for detecting the velocity of the controlled object, and position counter means connected between said position detector means and said data processing means for counting the output pulse of said position detector means to determine the present position of the controlled object.

3. An apparatus for positioning an object according to claim 2, wherein said position counter means is connected to said data processing means, and said velocity detector means is connected to said data processing means through a second analog to digital converter.

4. An apparatus for positioning an object according to claim 3, wherein said second means comprises an analog adder having one input connected to said data processing means through a digital to analog converter and a second input connected to said velocity detector means.

5. An apparatus for positioning an object according to claim 4, wherein said third means comprises an analog power amplifier.

6. An apparatus for positioning an object according to claim 2, wherein said second means comprises an analog adder having one input connected to said data processing means through a digital to analog converter and a second input connected to said velocity detector means.

7. An apparatus for positioning an object according to claim 1, wherein said first means comprises position detector means mechanically connected to said servo-motor means for detecting the position of the controlled object, position counter means connected between said position detector means and said data processing means for counting the output pulses of said position detector means to determine the present position of the controlled object, and velocity counter means connected to the output of said position detector means for counting the output pulses of said position detector means.

8. An apparatus for positioning an object according to claim 7, wherein said data processing unit further includes means for determining the present velocity of the controlled object from the output signal of said position counter means.

9. An apparatus for positioning an object according to claim 8, wherein said second means comprises an analog adder having one input connected to said data processing means through a digital to analog converter and a second input connected to said velocity counter means through a second digital to analog converter.

10. An apparatus for positioning an object according to claim 9, wherein said third means comprises an analog power amplifier.

11. An apparatus for positioning an object according to claim 7, wherein said second means comprises a digital adder having one input connected to said data processing means and a second input connected to said velocity counter means.

12. An apparatus for positioning an object according to claim 11, wherein said third means comprises a switching power amplifier and a modulator connecting the output of said digital adder to said switching power amplifier.

13. An apparatus for positioning an object according to claim 2, wherein said data processing means further includes means for determining the present velocity of the controlled object from the output signal of said position counter means.

14. An apparatus for positioning an object according to claim 13, wherein said second means comprises an analog adder having one input connected to said data processing means through a digital to analog converter and a second input connected to said velocity detector means.

15. An apparatus for positioning an object according to claim 14, wherein said third means comprises an analog-power amplifier.

16. An apparatus for positioning an object according to claim 1, wherein said first means comprises position detector means mechanically connected to said servo motor means for detecting the position of the controlled object and said data processing means includes means for determining the present velocity of the controlled object from the output signal of said position counter means.

17. An apparatus for positioning an object as claimed in claim 16, wherein said first means further comprises velocity means responsive to the movement of the controlled object for providing an output velocity signal indicative of the velocity of the controlled object to said second means.

18. An apparatus for positioning an object according to claim 17, wherein said first means further comprises position counter means connected between said position detector means and said data processing means for counting the output pulse of said position detector means to determine the present position of the controlled object.

19. An apparatus for positioning an object according to claim 18, wherein said velocity means comprises velocity counter means responsive to the output of said position detector means for counting the output pulses of said position detector means.

* * * * *